United States Patent [19]
Kratt

[11] Patent Number: 5,797,375
[45] Date of Patent: Aug. 25, 1998

[54] METHOD OF DETECTING AND DOCUMENTING EXHAUST-GAS RELEVANT MALFUNCTIONS OF A VEHICLE

[75] Inventor: Alfred Kratt, Schwieberdingen, Germany

[73] Assignee: Robert Bosch GmbH, Stuttgart, Germany

[21] Appl. No.: 806,410

[22] Filed: Feb. 26, 1997

[30] Foreign Application Priority Data

Feb. 27, 1996 [DE] Germany .................. 196 07 284.0

[51] Int. Cl.⁶ .................................................. F02M 37/04
[52] U.S. Cl. .................. 123/497; 123/479; 73/119 A
[58] Field of Search ................... 123/198 D, 495, 123/497, 479; 417/63; 73/117.3, 119 A

[56] References Cited

U.S. PATENT DOCUMENTS

| | | |
|---|---|---|
| 4,094,191 | 6/1978 | Goetsch et al. ............... 73/117.3 |
| 4,430,980 | 2/1984 | Pidgeon ........................ 123/497 |
| 5,386,721 | 2/1995 | Alvizar .......................... 73/116 |
| 5,499,538 | 3/1996 | Glidewell et al. ............. 73/119 A |
| 5,609,140 | 3/1997 | Kramer et al. ................ 123/497 |
| 5,701,863 | 12/1997 | Cemenska et al. ........... 123/198 D |

*Primary Examiner*—Thomas N. Moulis
*Attorney, Agent, or Firm*—Walter Ottesen

[57] ABSTRACT

The invention is directed to a method for detecting and documenting exhaust-gas relevant malfunctions of a vehicle having an internal combustion engine. The method includes the steps of evaluating the operating state of at least one component of the internal combustion engine in a circuit arrangement to delimit faults, which are caused by improper operation of the vehicle, relative to faults based on defects of the vehicle system; and, outputting a fault announcement and storing the fault announcement in a fault memory in dependence upon the operating state of the component.

11 Claims, 1 Drawing Sheet

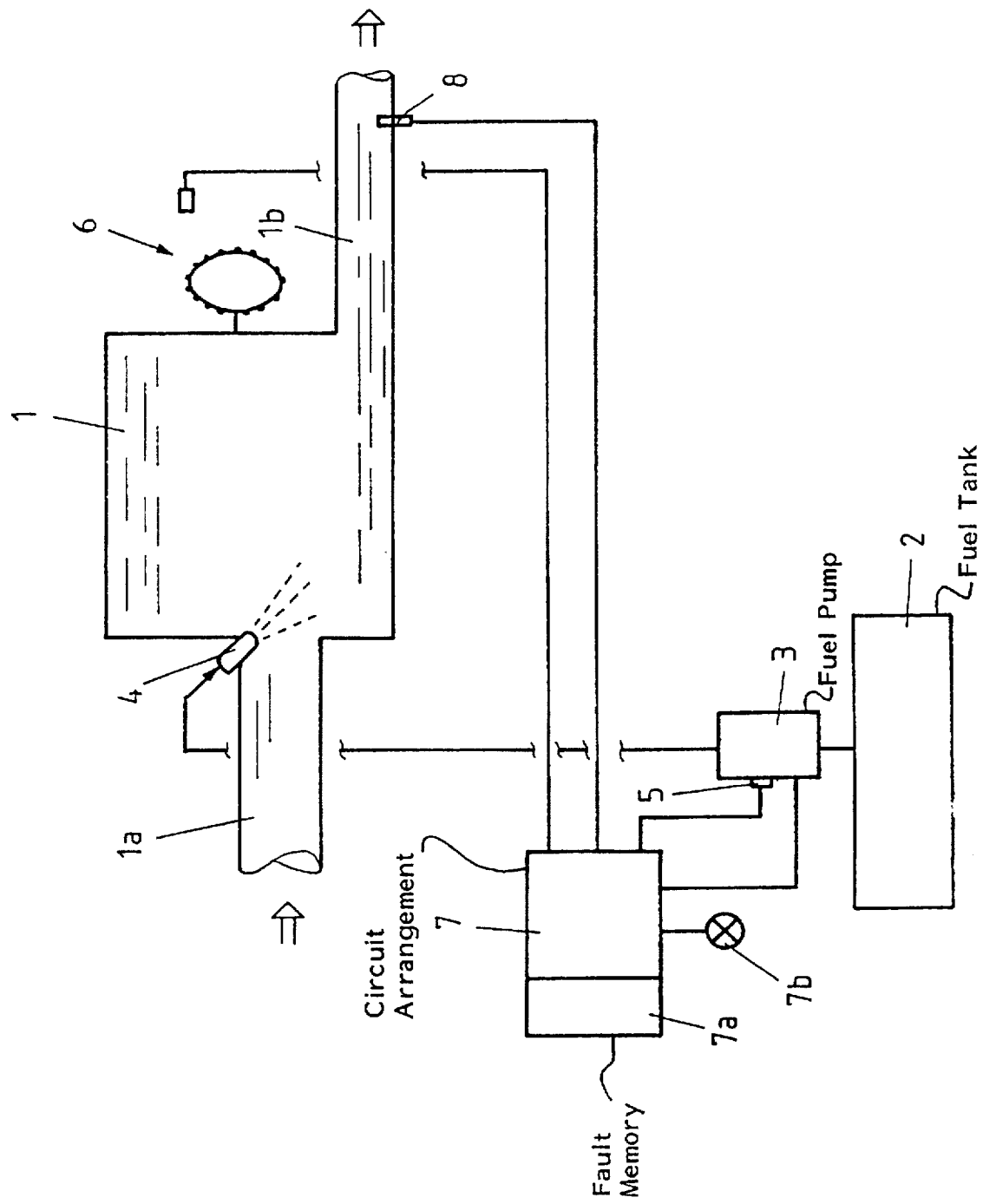

5,797,375

METHOD OF DETECTING AND DOCUMENTING EXHAUST-GAS RELEVANT MALFUNCTIONS OF A VEHICLE

FIELD OF THE INVENTION

The invention relates to a method of detecting and documenting exhaust-gas relevant malfunctions of a vehicle equipped with an internal combustion engine. The method is carried out with the aid of onboard means.

BACKGROUND OF THE INVENTION

Since 1993, the California Environmental Authority as well as United States Federal Regulations require that exhaust-gas relevant malfunctions of a motor vehicle having an internal combustion engine be detected and documented with the aid of onboard means (onboard diagnostic II). It is known to detect malfunctions utilizing sensors and to evaluate the malfunctions in a circuit unit. The malfunctions are indicated via a warning lamp (malfunction indicator lamp, MIL) which is mounted in the viewing field of the driver. With this fault display, the driver of the motor vehicle is notified that a visit to a service station should be made. At the same time, the malfunction detected in this manner is stored in an electronic fault memory.

Such malfunctions are, for example, malfunctions of the fuel supply, that is, faults that are caused by the fuel pump being inoperative, blockage of the fuel lines or the like.

The detection and documentation of certain malfunctions is problematic. These certain malfunctions include those which are caused by improper operation of the motor vehicle, for example, because of a deficiency of fuel caused by a fuel tank which has been driven to empty and by the use of nonsuitable fuel or fuel which is not prescribed for use such as fuel which cannot be used during summer.

Thus, the fuel pump sporadically pumps vapor instead of liquid when the tank is almost empty. The necessary metering of fuel to one or more cylinders of the engine of the motor vehicle can then drop so severely that combustion misfires occur. The uncombusted fuel is then, together with oxygen, afterburned in the catalytic converter whereby the temperature of the catalytic converter increases so greatly that permanent damage to the catalytic converter can occur. Furthermore, for an empty tank, mixture deviations can occur which cause the quality of the exhaust gas to deteriorate.

Corresponding temporary malfunctions because of hot-pumping problems can occur when utilizing unsuitable fuel, such as when utilizing winter fuel in summer at very high ambient temperatures.

Temporary malfunctions of this kind, which can easily be obviated by the operator of the motor vehicle (by tanking or utilizing the appropriate fuel), must be differentiated from malfunctions which are based on a permanent defect of the vehicle system.

Furthermore, the detection and documentation of malfunctions, which are caused by improper operation, are significant because of possible liability claims or warranty claims on the vehicle manufacturer. Defects of the vehicle caused by improper operation are the responsibility of the driver and not of the manufacturer.

Finally, the detection and documentation of such temporary malfunctions is also of significance for the maintenance of the vehicle because these temporarily occurring malfunctions do not define defects which must be eliminated by the personnel of the service station.

SUMMARY OF THE INVENTION

In view of the above, it is an object of the invention to provide a method of detecting and documenting exhaust-gas relevant malfunctions of a motor vehicle having an internal combustion engine utilizing onboard means. It is a further object of the invention to provide such a method which reliably differentiates faults caused by a faulty operation of the vehicle from actual and permanently present defects of the vehicle system.

The method of the invention is for detecting and documenting exhaust-gas relevant malfunctions of a vehicle having an internal combustion engine. The method includes the steps of: evaluating the operating state of at least one component of the internal combustion engine in a circuit arrangement to delimit faults, which are caused by improper operation of the vehicle, relative to faults based on defects of the vehicle system; and, outputting a fault announcement and storing the fault announcement in a fault memory in dependence upon the operating state of the component.

The evaluation of the operating state of at least one component of the internal combustion engine affords the considerable advantage that no additional effort is required to detect faults caused by the improper operation of the vehicle. This is so because, firstly, no additional sensors or the like are required; instead, components already present can be utilized and, secondly, because the operating states of most components of the engine are continuously detected by the circuit arrangement to control the engine.

Conceptually, it is conceivable to detect the operating state of any desired component. It is a special advantage however, when the component is the fuel pump and the operating state is the rpm thereof, because the rpm of the fuel pump can be detected in a simple manner. The detection of the rpm of the fuel pump is possible utilizing different methods. Thus, the rpm of the fuel pump can, for example, be detected by a Hall sensor.

It is also possible to detect the rpm of the fuel pump inductively or capacitively.

Furthermore, the rpm of the fuel pump can be detected via the supply voltage applied to the fuel pump and especially via the ripple of the supply voltage applied to the fuel pump.

The operating states of the individual components of the engine mutually influence each other. For this reason, it is a significant advantage to especially more closely delimit the faults that a further additional operating variable of the engine is detected and compared in the circuit arrangement to the operating state of the component and especially the operating state of the fuel pump. The output as well as the storage of the fault announcement takes place in dependence upon the comparison.

Various operating variables can be considered as additional operating variables. Thus, as an additional operating variable, the rpm and/or the smooth running of the engine can be detected via the rpm transducer.

It is also possible to detect a control variable of the lambda control, (for example the lambda integrator). Furthermore, and as an additional operating variable, the system pressure of the fuel supply system can be detected.

It is especially advantageous that the circuit arrangement for detecting and processing the malfunction is part of the control circuit of the internal combustion engine because in this way, separate circuits are not needed.

The fault memory can be externally read out especially for diagnostic purposes. The fault memory is advantageously part of the engine control.

BRIEF DESCRIPTION OF THE DRAWING

The invention will now be described with reference to the single FIGURE of the drawing which is a schematic of a circuit for carrying out the method of detecting and documenting exhaust-gas relevant malfunctions of a motor vehicle.

DESCRIPTION OF THE PREFERRED EMBODIMENTS OF THE INVENTION

The basic idea of the invention is to provide a method for detecting and documenting exhaust-gas relevant malfunctions of a vehicle equipped with an internal combustion engine with the aid of onboard means. In these onboard means, an evaluation of the operating state of at least one component of the engine is made in a circuit arrangement to delimit faults, which are caused by improper operation of the vehicle, from faults based on defects of the vehicle system. An output of a fault announcement as well as a storage of the fault announcement takes place in dependence upon the operating state of the component of the engine.

With this method, one can distinguish, in a reliable and simple manner, between temporary malfunctions, which are caused by improper operation of the vehicle, and permanent malfunctions which are based on a permanently present technical defect of the system of the vehicle.

The method of the invention will now be explained in the context of the detection and documentation of exhaust-gas relevant malfunctions of the vehicle, which are based upon an empty tank or the use of an unsuitable fuel (for example, the use of winter fuel in summer). It is understood that the method is not limited to the detection of such malfunctions; instead, the method can be applied to the detection and documentation of other exhaust-gas relevant malfunctions which are based on an improper operation of the vehicle.

In the drawing, an internal engine 1 is shown having an intake channel 1a and an exhaust channel 1b, a fuel tank 2 and a fuel pump 3. The fuel pump 3 pumps fuel out of the fuel tank 2 for injection into the combustion chambers, that is, via the intake channel 1a into the combustion chambers of the engine 1.

A sensor 5 is mounted on the fuel pump 3 and functions to detect the rpm of the fuel pump 3. This sensor 5 can, for example, be a Hall sensor or a capacitive or an inductive sensor. Furthermore, and in lieu of the sensor 5, the supply voltage applied to the fuel pump 3 can be tapped directly and in an especially simple manner. A conclusion can be drawn mathematically in a circuit arrangement 7 as to the rpm of the fuel pump from the ripple of the supply voltage.

A further sensor, for example an rpm transducer 6, is provided on the engine 1 for detecting the rpm thereof.

A lambda probe 8 known per se is mounted in the exhaust channel 1b of the engine 1.

The signals outputted by the sensor 5, the sensor 6 and the lambda probe 8 are supplied via respective signal lines to the circuit arrangement 7. The circuit arrangement 7 includes a fault memory 7a and a warning lamp 7b namely, a malfunction indicator lamp. The circuit arrangement 7 can be part of a control circuit of the internal combustion engine 1.

For the detection and documentation of exhaust-gas relevant malfunctions of the motor vehicle having an internal combustion engine 1 utilizing onboard means, the rpm of the fuel pump 3 is continuously detected via the sensor 5 and evaluated in the circuit arrangement 7. When the rpm of the fuel pump 3 exceeds pregiven limits, then a fault is present which is indicated by the warning lamp 7b and is stored in the memory 7a.

The fault, which is displayed and stored in this way, can be clearly assigned to a fault in the fuel supply which can be caused by an improper operation of the vehicle.

In addition to the detection and evaluation of the rpm of the fuel pump 3, the rpm or smooth running of the engine 1 is detected by the rpm transducer 6 and supplied to the circuit arrangement 7.

In lieu of detecting the smooth running of the engine 1 via the rpm transducer 6 or supplementary thereto, a control variable of the lambda control (for example, of the lambda integrator) can be detected and the signals are likewise supplied to the circuit arrangement 7.

Furthermore, the system pressure of the fuel supply system can be detected as an additional operating variable. This detection can be made, for example, via a pressure sensor.

In the circuit arrangement, a comparison as to plausibility of the rpm of the fuel pump 3 and of the rpm or smooth running of the engine 1 or the value of the lambda integrator or the system pressure of the fuel supply system is undertaken and, in the case of a deviation from a pregiven comparison criterion, a fault announcement is indicated and stored so that an additional delimiting of the fault is possible.

In this way, a malfunction which is caused by improper operation (for example, by running the tank 2 to empty or by utilizing an unsuitable fuel such as utilizing winter fuel in the summer) can be detected in a simple manner. In these cases, pumping problems occur because, in the first case, too little fuel is present and therefore fuel can be pumped only sporadically or only fuel vapor can be inducted and, in the second case, the fuel, because of a change of the consistency thereof (for example, by coagulation), can no longer be properly pumped. Such malfunctions become manifest in a change of the rpm of the fuel pump 3 which, in the first case, increases and, in the second case, decreases. At the same time, the running characteristics of the engine 1 are changed in a disadvantageous manner by this malfunction, for example, by misfires or by a disadvantageous change of the exhaust gas values.

With the method described above, it is possible to bring such changed running characteristics into a relationship to malfunctions based on the fuel supply which, for example, can be caused by improper operation. However, a defect of the fuel pump 3 can also be detected and documented in this way. It is especially advantageous with respect to the method that the fuel pump 3, which must perforce be provided, as well as the engine control, which too must be perforce provided, can be utilized to detect and document such malfunctions.

It is understood that the foregoing description is that of the preferred embodiments of the invention and that various changes and modifications may be made thereto without departing from the spirit and scope of the invention as defined in the appended claims.

What is claimed is:

1. A method for detecting and documenting exhaust-gas relevant malfunctions of a vehicle having an internal combustion engine, the method comprising the steps of:

evaluating the operating state of at least one component of said internal combustion engine in a circuit arrangement to delimit faults, which are caused by improper operation of the vehicle, relative to faults based on defects of the vehicle system; and, outputting a fault announcement and storing said fault announcement in a fault memory in dependence upon said operating state of said component.

2. The method of claim 1, wherein said one component is the fuel pump of said engine and said operating state is detected from the rpm of said fuel pump.

3. The method of claim 2, wherein said rpm is detected by utilizing a Hall sensor.

4. The method of claim 2, wherein said rpm is detected inductively or capacitively.

5. The method of claim 2, wherein said rpm is detected from the supply voltage applied to said fuel pump.

6. The method of claim 2, comprising the further steps of:

detecting an additional operating variable of said engine;

comparing said additional operating variable to said operating state of said component in said circuit arrangement; and, outputting a fault announcement and storing said fault announcement in a fault memory in dependence upon the comparison.

7. The method of claim 6, wherein said additional operating variable is the rpm of said engine and/or the smooth running of said engine; and, said additional variable is detected by an rpm transducer.

8. The method of claim 6, wherein said additional operating variable is a control variable of the lambda control.

9. The method of claim 6, wherein said additional operating variable is the system pressure of the fuel supply system.

10. The method of claim 1, wherein said circuit arrangement is part of a control circuit of the engine.

11. The method of claim 1, wherein said fault memory is part of the engine control and said fault memory can be read out externally.

* * * * *